July 22, 1958 R. J. ARNDT 2,844,669

NEGATIVE-IMPEDANCE REPEATER HAVING GAIN CONTROLS

Filed May 10, 1955 2 Sheets-Sheet 1

July 22, 1958 R. J. ARNDT 2,844,669

NEGATIVE-IMPEDANCE REPEATER HAVING GAIN CONTROLS

Filed May 10, 1955 2 Sheets-Sheet 2

United States Patent Office 2,844,669
Patented July 22, 1958

2,844,669

NEGATIVE-IMPEDANCE REPEATER HAVING GAIN CONTROLS

Raymond J. Arndt, Chicago, Ill., assignor to International Telephone and Telegraph Corporation, New York, N. Y., a corporation of Maryland Application May 10, 1955, Serial No. 507,441

7 Claims. (Cl. 179—175.31)

This invention relates to a negative-impedance repeater having gain controls. Its principal object is to provide a simple and effective arrangement for a negative-impedance repeater for use with a telephone transmission line, which incorporates readily adjustable means for controlling the overall gain, and for separately controlling the gain for the upper and for the lower transmitted frequencies.

A negative-impedance repeater may be either of the series type of the shunt type, being inserted in series with or placed in shunt of a telephone transmission line to reduce the transmission losses thereover. A series repeater increases the original line current therethrough, while a shunt repeater increases the original line potential thereat.

Recognized advantages of a negative-impedance repeater include low-cost simplicity and maintenance of low-frequency and D. C. signalling continuity.

Essentially, a negative-impedance repeater for use with a transmission line comprises (1) a connection to the transmission line (series or shunt, as required), (2) a line-matching network, (3) an amplifier, and (4) suitable input and output connections, for the amplifier. The output connection for the amplifier includes as load elements both the line-matching network and the line as seen through the line connection, while the input connection for the amplifier is taken from a suitable point in the output circuit to cause positive feedback, or regeneration, through which the amplifier acts to reduce transmission loss by increasing the line signal; that is, increasing line current for a series-connected repeater, or increasing line voltage for a shunt-connected repeater. The line-matching network is used to provide a local load with respect to both the original signal and its amplified counterpart to provide circuit means for supplying an input signal to the amplifier proportional to the originating line signal, and it contains resistive and reactive components so related to those of the line that substantially the same proportionality obtains over the frequency range of transmission except where altered to correct for distorted line characteristics.

Heretofore, negative-impedance repeaters of the foregoing character have been open to the objection that the signal gain thereof is adjustable only by changing the impedance of the line-matching network, to thereby alter the ratio of originating line signal to amplifier-input signal.

According to the invention, the foregoing drawback is overcome by provisions permitting the internal gain of the amplifier to be altered as desired to thereby raise and lower the gain in signal strength produced by the repeater. Thus, once the line-matching network has been adjusted to the line over the frequency range of transmission, that adjustment may remain fixed and a greater or lesser gain is realized by the amplifier gain adjustment.

In carrying out the invention, a two-stage amplifier is preferably employed which uses degenerative feedback to render the gain comparatively stable irrespective of replacements of amplifier elements and changes in power supply.

It has been chosen to illustrate the invention as applied to a repeater having an amplifier using two thermionic vacuum tubes in cascade, with tandem negative feedback controlled by a slide-arm potential divider to thereby adjust the effective gain of the amplifier. Additional controls associated with the negative feedback path are associated respectively with the gain for the upper and for the lower frequencies of transmission.

A further object is to provide a repeater of the foregoing character with an assortment of resistive and reactive impedance elements and terminals therefor which permit the ready make-up of a suitable line-matching network.

A related feature is that the said terminals are exposed for ready connection to corresponding terminals of a test box containing specialized switching apparatus for connecting up the impedance elements of the repeater in trial combinations until a suitable one is found, following which the test box is disconnected and the repeater terminals are strapped to correspond to the ascertained suitable switch settings thereof, preferably by applying a removable strapping strip to the terminals.

The foregoing and other objects and features of this invention and the manner of attaining them will become more apparent and the invention itself will be best understood, by reference to the following description of an embodiment of the invention taken in conjunction with the accompanying drawings comprising Figs. 1 to 5, wherein.

Figures 1, 2, 3:
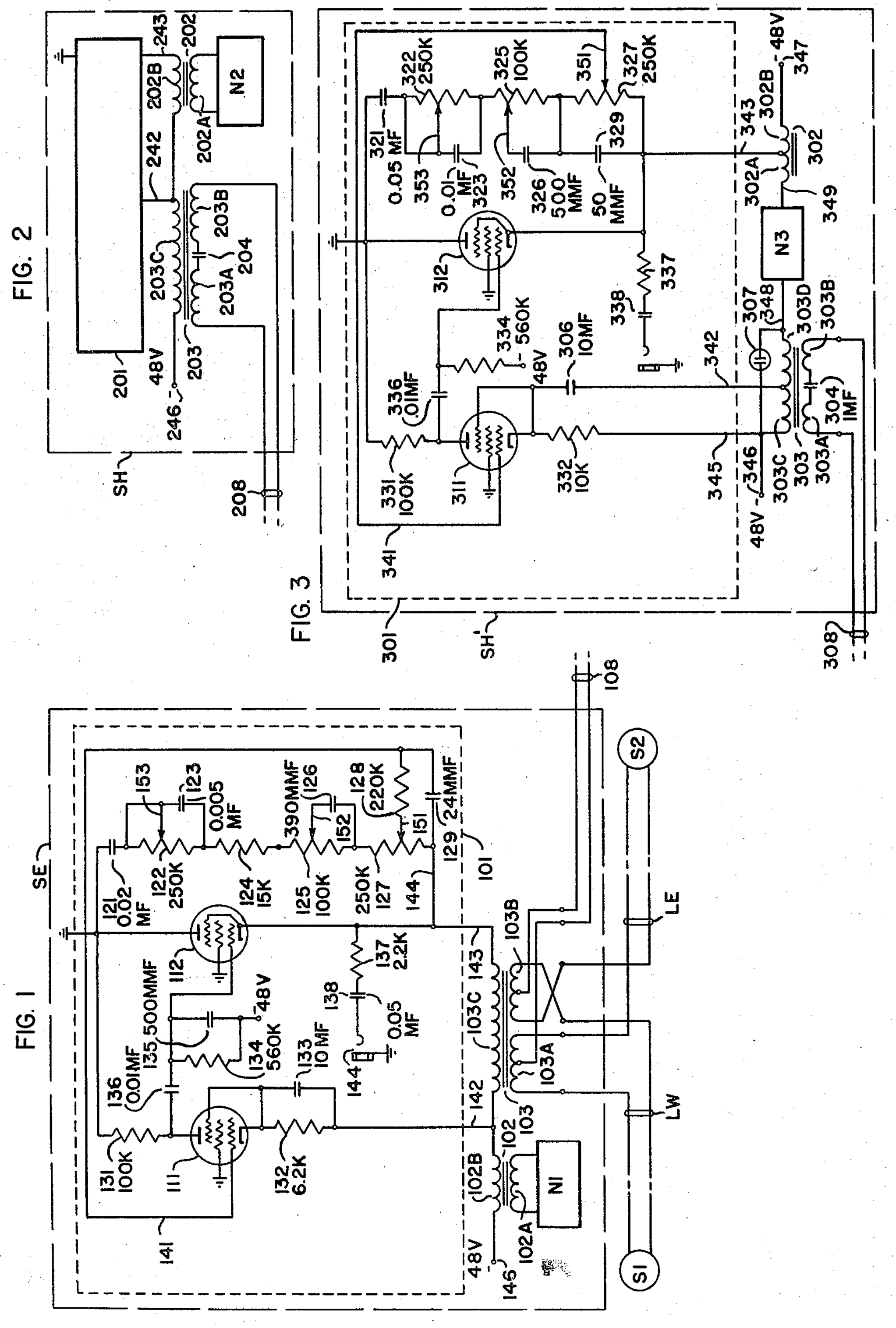
Fig. 1 shows a series type of negative-impedance repeater.
Fig. 2 shows a similar shunt type of negative-impedance repeater.
Fig. 3 shows an improved repeater of the shunt type.

*Fig. 1.—Series repeater*

A series repeater SE is shown in Fig. 1 connected in a telephone transmission line between line section LW and line section LE. The line sections LE and LW may be connected either directly or through switching equipment to respective telephone stations S1 and S2. The repeater SE includes a converter 101, a connection to the line through transformer 103 and a local impedance network N1 connected through transformer 102. The converter 101 includes an amplifier and a negative feedback network connected across the output of the amplifier between wire 144 and ground. The amplifier includes a voltage amplifying stage 111, and a cathode follower power output stage 112.

The repeater is connected with transformer windings 103A and 103B in series in the respective wires of the line, with line current flow series aiding in the two windings. Winding 103C is connected in the repeater so that the line load appears across it between wires 142 and 143. The local impedance network N1 is connected to transformer winding 102A, with winding 102B connected so that the local network load appears across it between terminal 146 and wire 142.

The output path of the amplifier is from ground at the plate of tube 112, through the tube to the cathode and wire 143, through the line load winding 103C to wire 142, through local network load winding 102B, to negative 48 volts at terminal 146.

The voltage amplifier stage 111 has its D. C. bias established by cathode resistor 132, by-passed for A. C. by condenser 133. A plate load resistor 131 is used, and signals at the plate are coupled through condenser 136 to the grid of power stage 112. The grid resistor 134, connected to negative 48 volts, is by-passed by condenser 135 to reduce the high frequency gain above the given range used.

For the principal input signals, tube 111 operates as a grounded grid stage, with the signal voltage which appears across the network winding 102B being coupled over wire 142 and through condenser 133 to the cathode of the tube. The amplified signals coupled from the plate of tube 111 to the grid of tube 112 are in phase with the principal input signals and control the output signal current, also in phase. Therefore, any line signal current coupled to the repeater through transformer 103 is increased. The voltage across the line windings of transformer 103 opposes the voltage drop in the line. The gain in the repeater depends on the ratio between the voltage drops across windings 102B and 103C.

In the negative feedback network, resistor 127 has a sliding tap 151 for overall gain control. Resistor 125 has a sliding tap 152 connected through condenser 126 to the lower end of the resistor for high frequency gain control. Resistor 124 limits the range of the high frequency gain control. Resistor 122 has a sliding tap 153 with condenser 123 connected between the tap and the lower end of the resistor to give a low frequency gain control. Condenser 121 reduces the low frequency gain below the given frequency range used. Condenser 129 in combination with resistor 128 reduces the high frequency gain above the range used. Signals from tap 151 are connected through resistor 128 over wire 141 to the grid of tube 111 in opposition to the principal input signals. The gain of the amplifier is reduced according to the proportion of the output voltage appearing between tap 151 and ground.

The voltage amplifier stage 111 may use a type 12AU6 pentode electron tube, and the power output tube 112 may be a type 35C5. The line transformer 103 may have 450 turns in each of the windings 103A and 103B and 900 turns in the winding 103C to give a one-to-one turns ratio, with an inductance of one henry across winding 103C. The local network transformer 102 may have 2,250 turns in winding 102A and 750 turns in winding 102B, with an inductance of three-fourths henry across winding 102B. The three-to-one turns ratio permits the use of practical component values in network N1.

To permit access to the amplifier output for monitoring purposes, while maintaining A. C. and D.C. isolation, a connection is made from the cathode of tube 112 through resistor 137 and condenser 138 to jack 144. This circuit permits a low impedance monitor such as head phones to be used.

*Fig. 2.—Shunt repeater*

A shunt repeater SH is shown in Fig. 2, with a circuit similar to that of the series repeater shown in Fig. 1. The converter 201 may be similar to the converter 101. The repeater circuit is arranged so that the principal input to the amplifier between wire 242 and terminal 246 is taken across the line. The line transformer 203 is connected with winding 203C on the repeater side and windings 203A and 203B on the line side across wire pair 208, with a condenser 204 between the windings 203A and 203B to avoid a low resistance shunt through the transformer across the line for D. C. and low frequency signalling.

The shunt repeater SH may be used in combination with the series repeater SE by connecting wire pair 208 to pair 108 for a T connection, or directly across either line section LE or LW for an L connection. Wire pair 208 may be connected directly across a line to use the shunt repeater alone. The local impedance network N2 is connected to winding 202A of transformer 202. The output path from the amplifier on wire 243 is through winding 202B of the local network transformer and winding 203C of the line transformer to negative 48 volts at terminal 246.

A voltage proportional to the line voltage is applied at wire 242 to the input of the amplifier, and an amplified voltage in phase with the input voltage appears across the output of the amplifier, and increases the voltage across the line. The current flow from the repeater across the line is opposite to the normal current flow through the shunt impedance of the line.

*Fig. 3.—Improved shunt repeater*

The circuit used in repeater SH' shown in Fig. 3 overcomes some practical disadvantages of repeater SH shown in Fig. 2. In Fig. 2 the condenser 204 adds additional capacitance in the line circuit and may cause resonance at frequencies within the desired range. The transformer 202 across network N2 results in a low shunt impedance across network N2 at low frequencies. These and other factors are difficult to compensate for with the circuit arrangement shown.

In Fig. 3, the line transformer 303 is connected from path 308, which may be connected to the line in a manner similar to that described for path 208, through winding 303A, condenser 304, and winding 303B. The input of the amplifier between wire 342 and terminal 346 is connected across winding 303C. To reduce the effect at the input of the amplifier from surges on the line, transformer 303 is designed to saturate at high signal levels, and neon bulb 307 is used to clip any high voltage peaks which appear across windings 303C and 303D of the transformer. Since transformer 303 is designed for saturation, bias resistor 332 for tube 311 is connected directly to negative 48 volts at terminal 346, and the A. C. input signals from wire 342 are connected to the cathode through condenser 306.

An output transformer 302 is used to couple signals from the output of the amplifier at wire 343 to network terminal 349. The amplifier output path is from ground at the plate of tube 312, over wire 343, through winding 302B, to negative 48 volts at terminal 347. The output appearing across windings 302A and 302B is connected from wire 349, through network N3, and windings 303D and 303C of the line transformer to terminal 346.

The converter 301 is generally similar to the converter 101 shown in Fig. 1. A single condenser 329 connected across resistor 327 serves to reduce the high frequency gain above the given range used, and serves the same general purpose as condenser 129, resistor 128, and condenser 135 shown in Fig. 1.

Overall gain control with slider 351, high frequency gain control with slider 352, and low frequency gain control with slider 353 are obtained as with the similar controls shown in Fig. 1.

The line transformer 303 has a turns ratio such that when the impedance across path 308 is 300 ohms, the impedance to the input of the amplifier across the winding of 303C is 900 ohms, and the total impedance in the output path across the windings 303C and 303D is 6,000 ohms. The turns ratio of output transformer 302 is such that when the impedance in the output circuit across windings 302A and 302B is 12,000 ohms, the impedance across winding 302B is 1,800 ohms.

Figure 4:
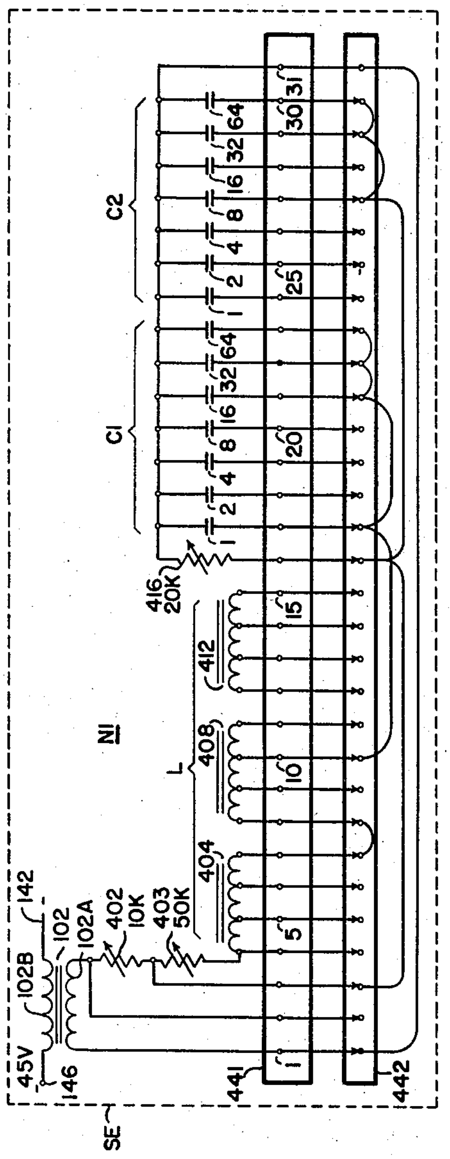
Fig. 4 shows a local impedance network used in the repeaters.

*Fig. 4.—Network*

The network N1 of repeater SE is shown in detail in Fig. 4. The components of the repeater are connected to a male connector strip 441 which is on an outside surface of the repeater. The components include a variable resistor 402 between terminals 2 and 3, a variable resistor 403 between terminals 3 and 4, an inductor 404 between terminals 4 and 7 with taps to terminals 5 and 6, an inductor 408 between terminals 8 and 11 with taps to terminals 9 and 10, and an inductor 412 between terminals 12 and 15 with taps to terminals 13 and 14, a variable resistor 416 between terminals 16 and 31, and a condenser between terminal 31 and each of the terminals 17 to 30.

Transformer winding 102A is connected between terminals 1 and 2 with winding 102B connected between the battery terminal 146 and wire 142 to the remainder of the repeater as shown in Fig. 1. A female connector 442, which may be engaged with connector 441, has jumpers soldered to its terminals to obtain the required form and values for the network according to the line with which the repeater is used.

To obtain various forms of networks, the resistors 402, 403 and 416 are used as individual components; sections selected from inductors 404, 408, and 412 are used together as an inductor L; selected condensers of those connected to terminals 17 to 23 are used as a capacitor C1; and selected condensers of those connected to terminals 24 to 30 are used as a capacitor C2. The sections of inductor L have relative values of one for each section of inductor 404, four for each section of inductor 408, and sixteen for each section of inductor 412.

These values may be 30 millihenrys for each section of inductor 404, 120 millihenrys for each section of inductor 408, and 480 millihenrys for each section of inductor 412. These sections may be connected in series as required to obtain any inductance up to the total with all sections in series. The individual condensers of each of the capacitors C1 and C2 have values in a binary progression, as indicated by the digits 1 to 64, which may be from 0.001 microfarad to 4.064 microfarad. Individual condensers are connected in parallel to obtain the desired value for each of capacitors C1 and C2.

The connectors 441, 442, and 542 (Fig. 5) may be of the type disclosed in U. S. Patent No. 2,640,183 or Patent No. 2,559,715.

Figure 5:
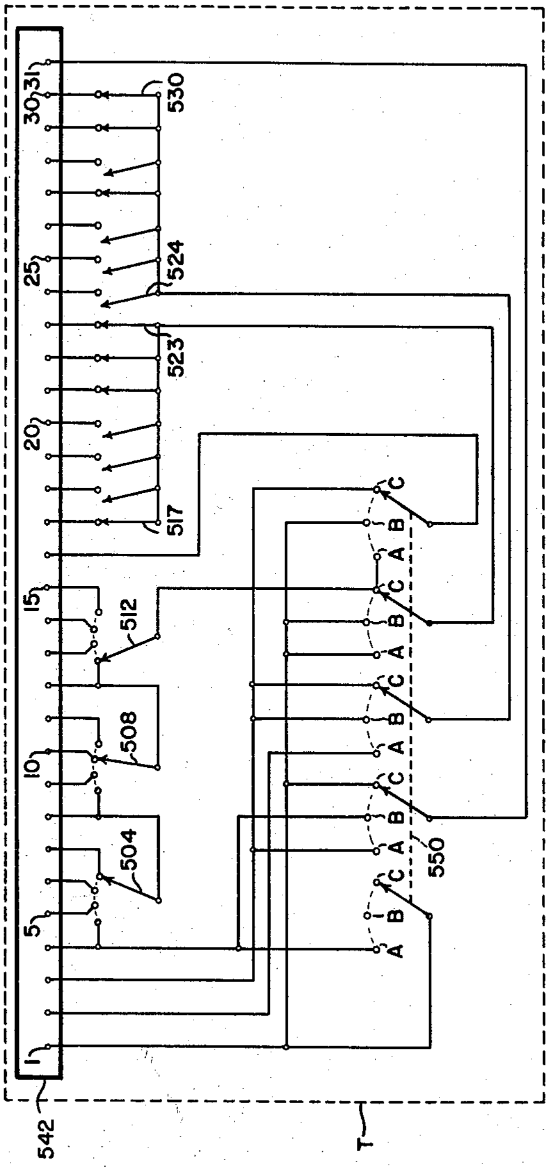
Fig. 5 shows a test set for adjusting the repeater.

*Fig. 5.—Test set*

A test set T, shown in Fig. 5, is used in setting up and adjusting the repeater SE while it is operating and connected to the line with which it is to be used.

The test set T includes switches and connectors, not shown, (1) for connecting the test set between the line and the repeater; (2) for connecting a variable frequency oscillator across one-ohm resistors inserted in the line; (3) for connecting an indicating device, such as a vacuum-tube voltmeter or an oscilloscope, to obtain a measure of signal power; and (4) for switching the repeater in and out of the line.

A female connector 542, has an arrangement of switches connected to its terminals. For adjustment of the network N1 (Fig. 4), the connector 442 is removed, and the repeater SE is placed on test set T with connectors 441 and 542 engaged.

A switch 550, comprising five sections ganged together, is used to select the form of network, according to the type of line. There are three different arrangements, A, B, and C, in which the resistors 402, 403, and 416, the inductor L, and the capacitors C1 and C2 may be used. The value of inductor L is determined by switches 504, 508, and 512; of capacitor C1, by switches 517 to 523; and of capacitor C2, by switches 524 to 530. The resistors 402, 403, and 416 are adjusted directly.

During testing, the gain of the repeater is determined over a range of frequencies which includes the frequency range to be used. The resistors 402, 403, and 416, and the controls 151, 152, and 153 (Fig. 1) in the repeater, and the switches shown in the test set, are adjusted until the desired gain and frequency equalization is obtained.

Jumpers are then placed on connector 442 according to the setting of the switches in test set T. In the example shown, network form C is used with an inductance L of 330 millihenrys, a capacitance C1 of 0.113 microfarad, and a capacitance C2 of 0.104 microfarad. The connectors 441 and 542 are then disengaged, and connector 442 is placed on connector 441. The gain may then be rechecked over the frequency range.

With this arrangement, the actual components of the network N1 are used in adjusting the repeater SE, rather than using similar components in the test set. Therefore errors caused by differences in value of components having the same nominal value, and by aging of components, are avoided.

While I have described above the principles of my invention in connection with specific apparatus, it is to be clearly understood that this description is made only by way of example and not as a limitation to the scope of my invention.

I claim:

1. In a negative-impedance type of repeater for reducing the loss in strength of signals transmitted within a given frequency range over an associated transmission line, a local network having impedance characteristics over the frequency range similar to those of the transmission line, an amplifier having a principal and an auxiliary signal-input path and having a signal-output path, circuit means for effectively connecting both the line and the local network in the signal-output path of the amplifier to comprise load elements which consume output power according to their respective impedances, circuit means for applying signals to the principal signal-input path of the amplifier according to signal power consumed in one of said load elements, and means for variably controlling the amount by which the said loss in signal strength is reduced, comprising means for obtaining auxiliary signals proportional to the total output power of the amplifier and for applying them to the auxiliary signal-input path of the amplifier in opposition to the said signals in its principal signal-input path, the last said means including adjustable means for varying the proportionality between the auxiliary signals and the said total output power throughout the said frequency range.

2. A negative-impedance type of repeater according to claim 1, wherein the said means for obtaining and applying the said auxiliary signals includes a second adjustable means for varying the said proportionality at high frequencies within the given frequency range, and includes a third adjustable means for varying the said proportionality at low frequencies within the given frequency range.

3. A negative-impedance type of repeater according to claim 1, wherein the said means for obtaining and applying the said auxiliary signals comprises a feedback network shunted across the said signal-output path of the amplifier, the said feedback network includes a resistor, and the said auxiliary input path is coupled to an adjustable tap on the said resistor for effecting variations in the proportionality between the said auxiliary signals and the total output voltage throughout the said given frequency range.

4. A negative-impedance type of repeater according to claim 3, wherein the said feedback network includes a condenser in combination with a second resistor having adjustable means for varying the proportionality between the auxiliary signals and the total output voltage at the high frequencies within the said given frequency range, and includes a further condenser in combination with a third resistor having adjustable means for varying the proportionality between the auxiliary signals and the total output voltage at low frequencies within the given frequency range, the said feedback network further including circuit means including further condensers for increasing the proportionality between the auxiliary signals and the total output voltage at high frequencies above and at low frequencies below the said given frequency range, whereby the gain of the repeater is reduced at frequencies outside the given frequency range.

5. In a negative-impedance type of repeater according to claim 1, a first connector, the said local network including a plurality of impedance elements connected to respective terminals of the first connector, a test set, switching means in the test set, a second connector in the test set, means for engaging the first and the second connectors to establish connections between impedance elements and the switching means, means including the said adjustable means and the switching means for obtaining a desired gain and frequency equalization, a third connector, means for making connections between certain terminals of the third connector according to the resulting setting of the switching means, means for disengaging the first and the second connectors, and means for engaging the first and third connectors to establish the same connections between the said impedance elements as made by the switching means.

6. In a negative-impedance type of repeater including an amplifier for reducing the loss in strength of signals transmitted within a given frequency range over an associated transmission line, a local network for providing impedance to control the amplifier according to the relationship between that impedance and that of the transmission line, the local network including a plurality of impedance elements, a plurality of terminals connected to the impedance elements, a test set, switching means in the test set, means for connecting said switching means to said terminals, the switching means being variably settable to correspondingly interconnect the said terminals for corresponding values of the said provided impedance, means including the switching means in one of its settings for determining a combination of the impedance elements, which gives the said provided impedance a suitable relationship to the impedance of the transmission line over the given frequency range, means for disconnecting the switching means from the terminals, and means for making connections between the terminals corresponding to the last said setting of the switching means.

7. In a negative-impedance type of repeater according to claim 6, a first connector having the said terminals thereon, a second connector in the test set connected to the said switching means, the said means for connecting the terminals to the switching means comprising engaging the first and the second connectors, a third connector having strapping terminals thereon corresponding to the said terminals connected to the impedance elements, means for connecting wires between the strapping terminals to make connections corresponding the resulting setting of the switching means, the said means for disconnecting the switching means comprising disengaging the first and the second connectors, and the said means for making connections between the terminals connected to the impedance elements comprising engaging the first and the third connectors.

References Cited in the file of this patent

UNITED STATES PATENTS

| | | |
|---|---|---|
| 1,779,382 | Mathes | Oct. 21, 1930 |
| 2,236,690 | Mathes | Apr. 1, 1941 |
| 2,282,870 | Lundie | May 12, 1942 |
| 2,370,221 | Barney | Feb. 27, 1945 |

FOREIGN PATENTS

| | | |
|---|---|---|
| 716,555 | Great Britain | Oct. 6, 1954 |